US010714765B2

(12) United States Patent
Jung et al.

(10) Patent No.: US 10,714,765 B2
(45) Date of Patent: Jul. 14, 2020

(54) MANUFACTURING APPARATUS AND METHOD FOR CHANNEL PLATE

(71) Applicant: LG CHEM, LTD., Seoul (KR)

(72) Inventors: Hye Mi Jung, Daejeon (KR); Jae Choon Yang, Daejeon (KR); Jee Hoon Jeong, Daejeon (KR); Kyung Mun Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 300 days.

(21) Appl. No.: 15/765,757

(22) PCT Filed: Oct. 26, 2016

(86) PCT No.: PCT/KR2016/012064
§ 371 (c)(1),
(2) Date: Apr. 4, 2018

(87) PCT Pub. No.: WO2017/074006
PCT Pub. Date: May 4, 2017

(65) Prior Publication Data
US 2018/0287168 A1 Oct. 4, 2018

(30) Foreign Application Priority Data
Oct. 30, 2015 (KR) .................. 10-2015-0152545

(51) Int. Cl.
*H01M 8/026* (2016.01)
*H01M 8/0263* (2016.01)
(Continued)

(52) U.S. Cl.
CPC ......... *H01M 8/026* (2013.01); *H01M 8/0232* (2013.01); *H01M 8/0245* (2013.01);
(Continued)

(58) Field of Classification Search
CPC combination set(s) only.
See application file for complete search history.

(56) References Cited

U.S. PATENT DOCUMENTS

| 6,521,369 | B1 * | 2/2003 | Mercuri .............. | H01M 4/8605 |
| | | | | 429/483 |
| 2002/0172855 | A1 * | 11/2002 | Mercuri .................. | H01M 4/96 |
| | | | | 429/514 |

(Continued)

FOREIGN PATENT DOCUMENTS

| CN | 102265442 B | 9/2014 |
| JP | 47-47238 B | 3/1972 |

(Continued)

OTHER PUBLICATIONS

International Search Report for PCT/KR2016/012064 dated Jan. 26, 2017.

*Primary Examiner* — Kaity V Chandler
(74) *Attorney, Agent, or Firm* — Birch, Stewart, Kolasch & Birch, LLP

(57) ABSTRACT

The present invention relates to an apparatus and a method for manufacturing a channel plate, and according to one aspect of the present invention, there is provided an apparatus for manufacturing a channel plate, which is a manufacturing apparatus for forming a channel for transferring a substance to a plate, comprising a slitting unit provided to have a predetermined pattern for forming a plurality of openings on the plate in a transport process of the plate and a pressing unit provided to form a channel on the plate by pressurizing the opening region of the plate passing through the punching unit to bend it in a predetermined angle and direction.

16 Claims, 6 Drawing Sheets

(51) Int. Cl.
*H01M 8/0245* (2016.01)
*H01M 8/1004* (2016.01)
*H01M 8/24* (2016.01)
*H01M 8/0232* (2016.01)

(52) U.S. Cl.
CPC ....... *H01M 8/0263* (2013.01); *H01M 8/1004* (2013.01); *H01M 8/24* (2013.01); *Y02P 70/56* (2015.11)

(56) References Cited

U.S. PATENT DOCUMENTS

| | | | | |
|---|---|---|---|---|
| 2002/0180094 | A1* | 12/2002 | Gough | B29C 59/04 264/127 |
| 2003/0113608 | A1* | 6/2003 | Hong | H01M 8/0206 429/434 |
| 2004/0001986 | A1* | 1/2004 | Yazici | H01M 4/8892 502/101 |
| 2009/0269671 | A1* | 10/2009 | Kim | B29C 43/203 429/247 |
| 2011/0244369 | A1* | 10/2011 | Kondo | H01M 8/0247 429/513 |

FOREIGN PATENT DOCUMENTS

| | | |
|---|---|---|
| JP | 9-22703 A | 1/1997 |
| JP | 2001-221588 A | 8/2001 |
| JP | 2003-297384 A | 10/2003 |
| JP | 3838135 B2 | 10/2006 |
| JP | 2010-251020 A | 11/2010 |
| JP | 2012-227132 A | 11/2012 |
| JP | 2013-103231 A | 5/2013 |
| KR | 10-2003-0049805 A | 6/2003 |
| KR | 10-2009-0112771 A | 10/2009 |

\* cited by examiner

[Figure 1]
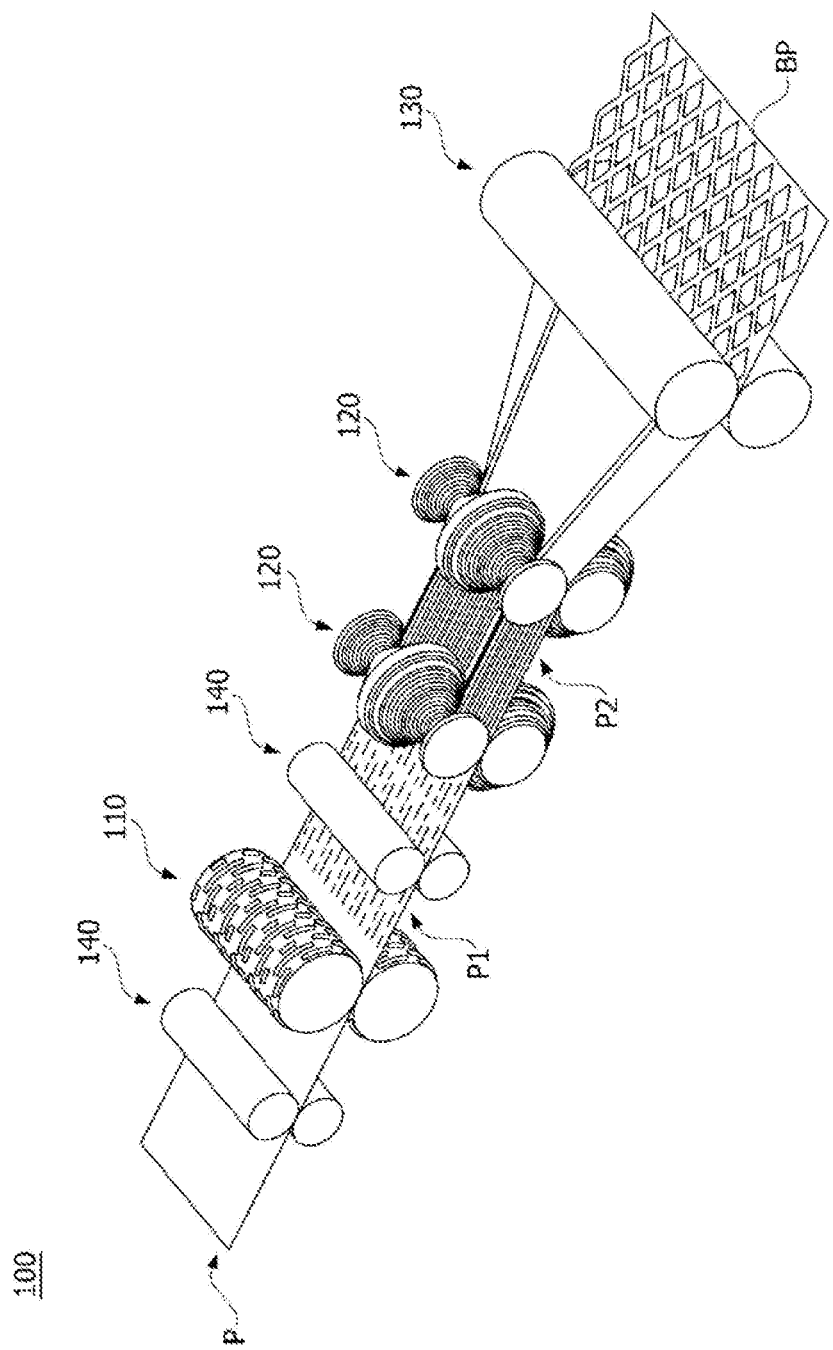

[Figure 2]
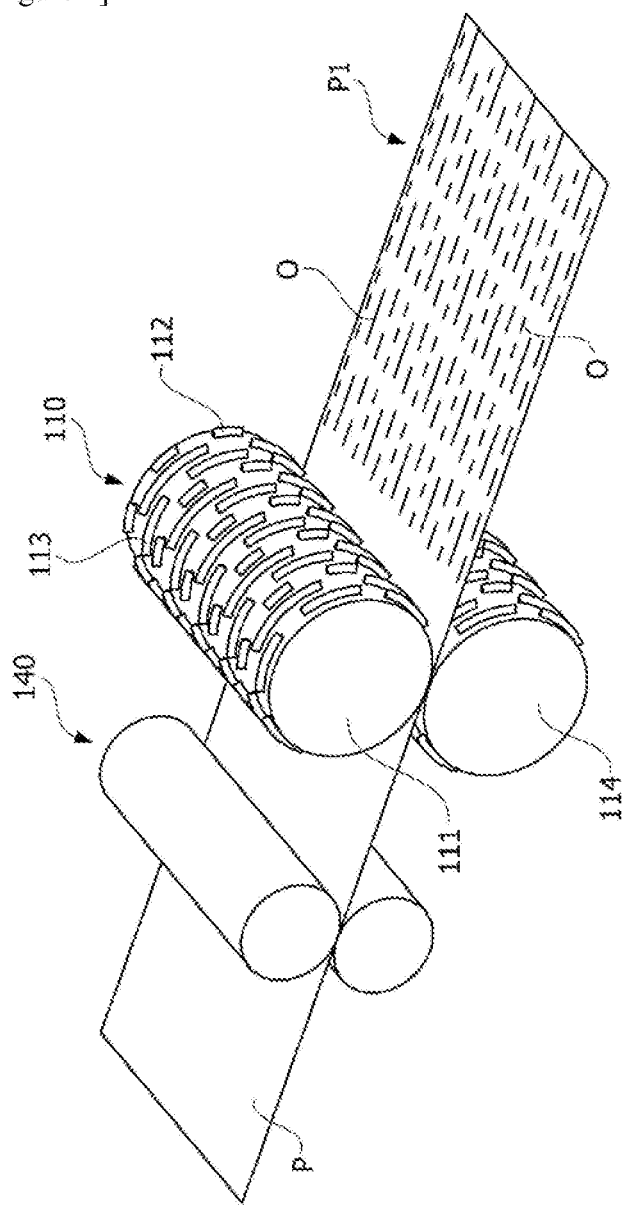

[Figure 3]
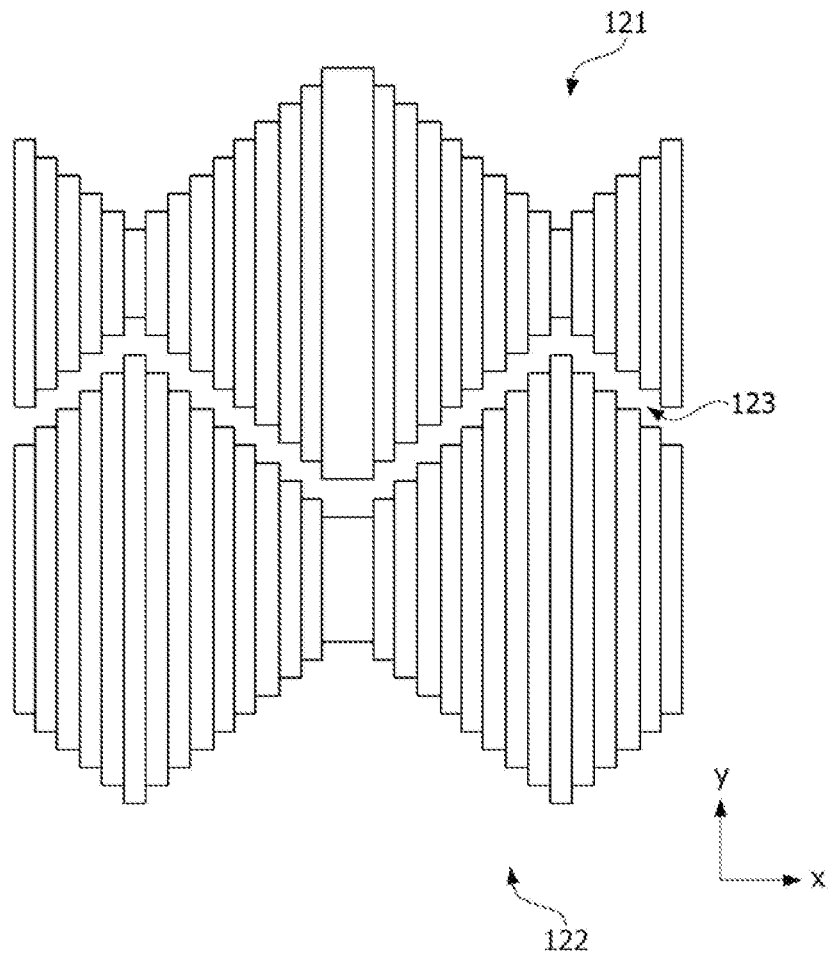
[Figure 4]
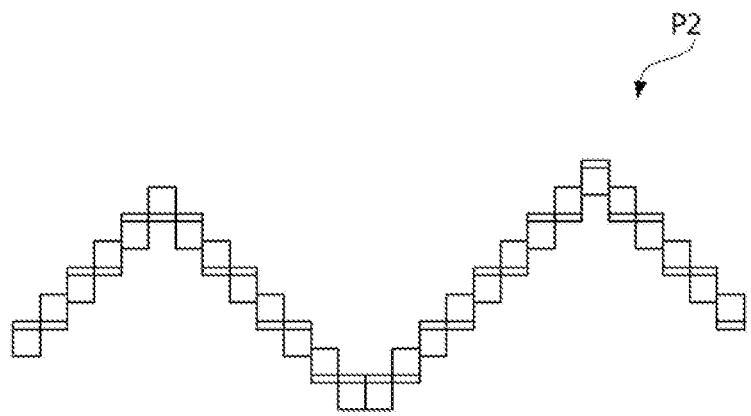

[Figure 5]
[Figure 6]
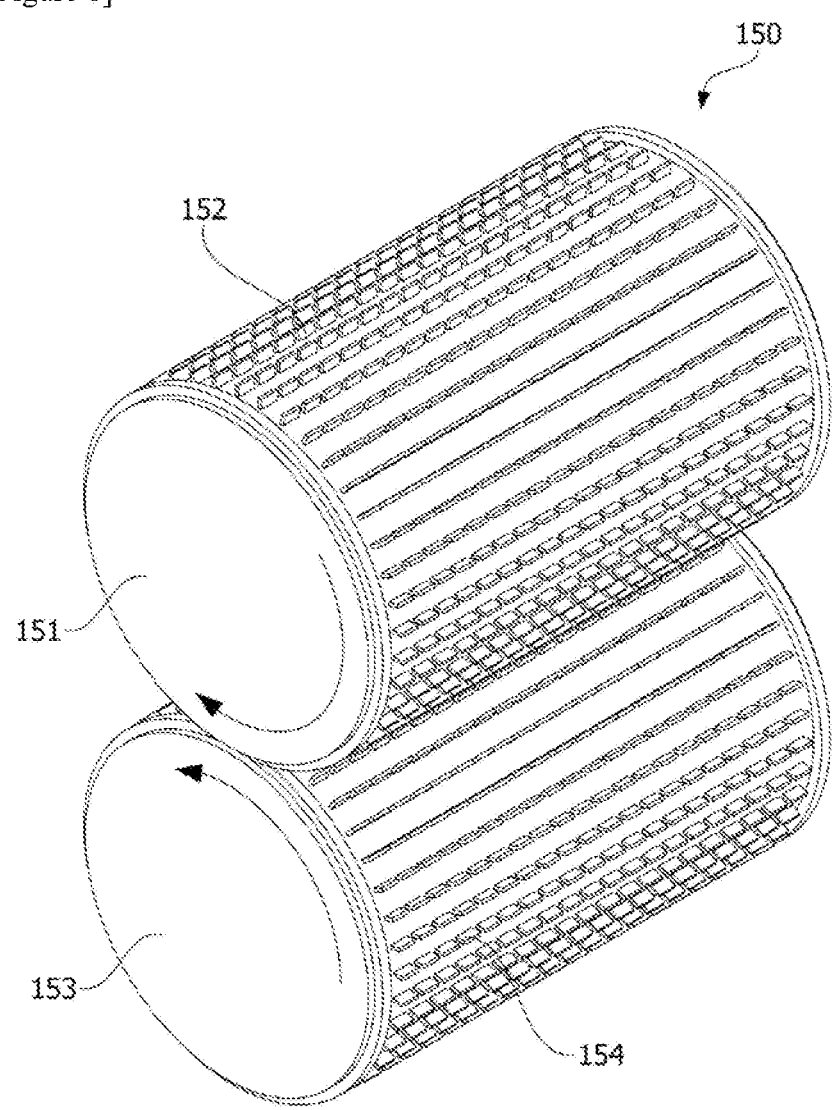

[Figure 7]
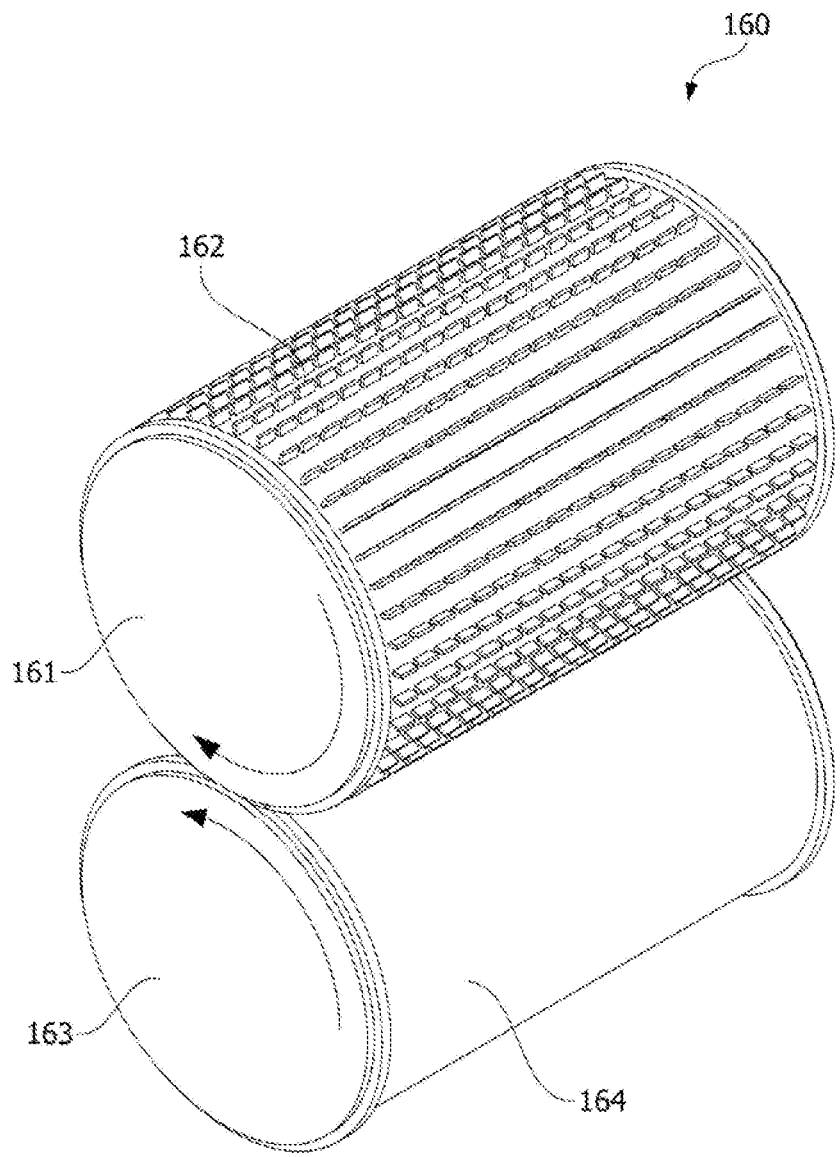

[Figure 8]
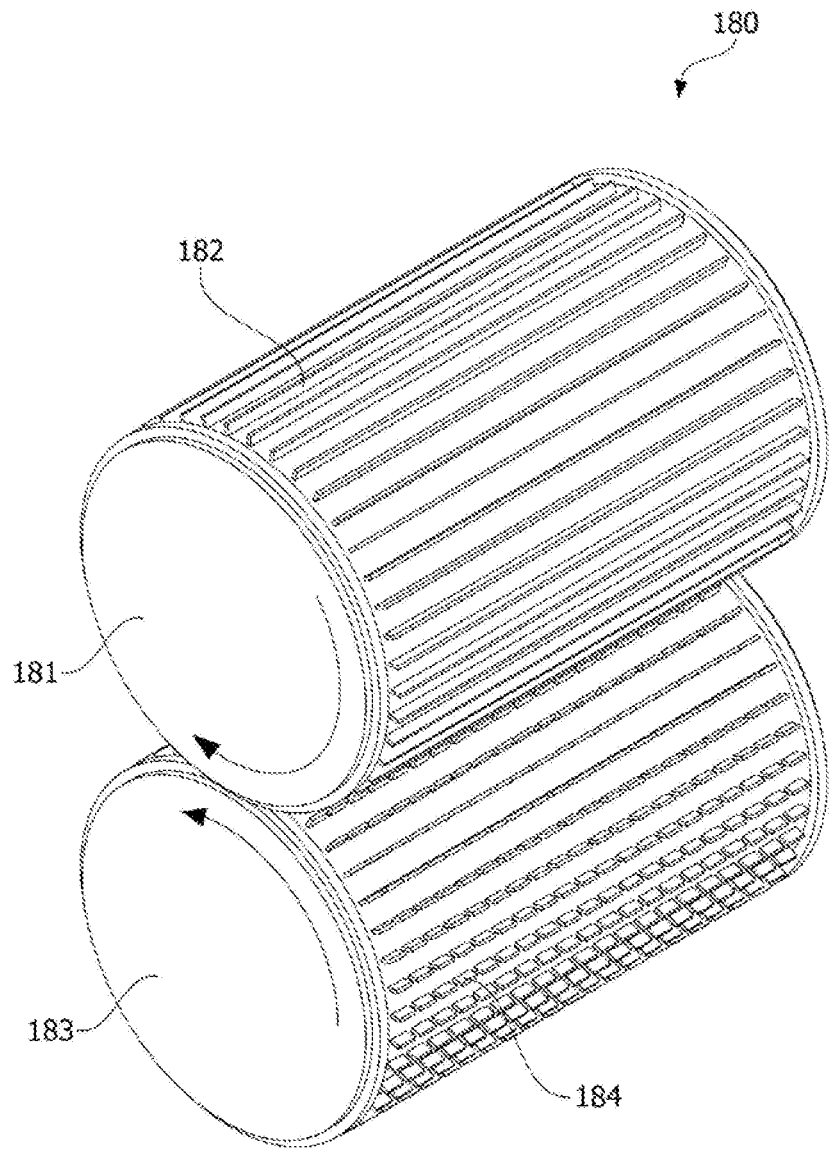

MANUFACTURING APPARATUS AND METHOD FOR CHANNEL PLATE

TECHNICAL FIELD

The present invention relates to an apparatus and a method for manufacturing a channel plate, and particularly, to an apparatus and a method for manufacturing a separating plate for a fuel cell.

This application claims the benefit of priority based on Korean Patent Application No. 10-2015-0152545 filed on Oct. 30, 2015, the disclosure of which is incorporated herein by reference in its entirety.

BACKGROUND ART

Generally, a fuel cell system may include a fuel cell stack, and a fuel supply part for supplying fuel containing hydrogen to the fuel cell stack and an air supply part for supplying an oxidant containing oxygen necessary for an electrochemical reaction of the fuel cell stack. The fuel cell system having the above structure generates electrical energy by the electrochemical reaction of fuel and air and discharges heat and water as by-products of the reaction.

The fuel cell stack is formed by successively arranging separating plates, and the separating plates may be disposed on both sides of a membrane-electrode assembly (MEA), respectively, across the membrane-electrode assembly.

The separating plate may include a pair of metal plates, and the separating plate is provided with a hydrogen flow channel and an air flow channel for supplying fuel and air to the membrane-electrode assembly, respectively, and a cooling water flow channel for fluidizing a cooling medium (for example, cooling water). At this time, the cooling water flow channel may be provided so that the cooling medium flows into the space between the pair of plates. Here, each flow channel is formed by a channel and/or a rib.

As a conventional method for manufacturing a separating plate for a fuel cell, a method of partially modifying/remodeling a general metal lath or expanded metal lath process has been used. However, when a metal porous separating plate is manufactured by the conventional metal lath or expanded metal lath method, there are technical problems such that the time/expense required for constructing/manufacturing molding press apparatuses and precision molds increases and the production efficiency decreases.

DISCLOSURE

Technical Problem

It is a problem to be solved that the present invention provides an apparatus and a method for manufacturing a channel plate capable of improving productivity and economic efficiency in preparing a channel plate, particularly, a separating plate for a fuel cell.

Technical Solution

To solve the above problem, according to one aspect of the present invention, there is provided an apparatus for manufacturing a channel plate, which is a manufacturing apparatus for forming a channel for transferring a substance to a plate, comprising a slitting unit and a pressing unit. Specifically, the apparatus for manufacturing a channel plate comprises a pair of first rollers disposed to allow passage of the plate, and comprises a slitting unit provided with a plurality of raised patterns on the outer circumferential surface of each first roller in order to form a plurality of openings on the plate in a transport process of the plate and a pressing unit provided to form a channel on the plate by pressurizing the opening region of the plate passing through the slitting unit to bend it in a predetermined angle and direction.

Also, the plurality of raised patterns may be provided so as to have the same length, width, and thickness.

Also, the plurality of raised patterns may be provided so that at least one of length, width, and thickness is different from each other.

Also, the pair of first rollers may have the same structure. In addition, the raised pattern of the upper first roller and the raised pattern of the lower first roller, which contact a specific point of the plate, may be provided so as to be the same.

Also, the pressing unit may comprise a pair of second rollers disposed to allow passage of the plate, and at least one second roller may have a plurality of raised patterns on the outer circumferential surface.

Also, the pair of second rollers may have the same raised pattern, and the raised pattern of the upper second roller and the raised pattern of the lower second roller, which contact a specific point of the plate, may be provided so as to be the same.

Also, the pair of second rollers may have different raised patterns, and the raised pattern of the upper second roller and the raised pattern of the lower second roller, which contact a specific point of the plate, may be provided so as to be different from each other.

Also, one of the second rollers may have a plurality of raised patterns on the outer circumferential surface, and the remaining second roller may have no raised pattern on the outer circumferential surface.

Also, the channel plate may be a separating plate for a fuel cell.

Also, the manufacturing apparatus may further comprise a plurality of transport rolls for transporting the plate.

Also, the pressing unit may comprise a pair of third rollers. In addition, the pair of third rollers may be provided so as to have one or more stepped portions along the direction of the rotational axis, respectively.

Also, the manufacturing apparatus may further comprise a rolling unit for rolling the plate passing through the pressing unit.

Also, the rolling unit may comprise a pair of rolling rolls rotatably provided.

Also, the pair of third rollers may be provided so that the diameter of the upper third roller and the diameter of the lower third roller, which contact a specific point of the plate, are different from each other.

In addition, according to another aspect of the present invention, there is provided a method for manufacturing a channel plate for forming a channel for transferring a substance to a plate, which comprises a slitting step for forming a plurality of openings on the plate using a pair of first rollers provided to have a predetermined pattern in a transport process of the plate, and a pressurizing step for forming a channel on the plate by pressurizing the opening region of the completely slit plate with a pair of second rollers and bending it in a predetermined angle and direction.

Furthermore, the manufacturing method may further comprise a rolling step for rolling the plate in the transport process of the plate after the pressurizing step is completed.

Furthermore, the manufacturing method may further comprise a spreading step for at least partially expanding the bent region of the plate in the transport process of the plate after the pressurizing step is completed.

Advantageous Effects

As described above, the apparatus and method for manufacturing a channel plate associated with one embodiment of the present invention have the following effects.

It is possible to design a microhole (channel) shape of a three-dimensional metal porous separating plate for promoting the transfer of the reactant gas (oxidant, for example, oxygen) in the fuel cell reaction surface (improving an utilization ratio of the reactant gas) and controlling water balance.

Furthermore, in realizing the metal porous separating plate, the productivity and cost-effectiveness can be improved at the same time through a rotary manufacturing technique.

In addition, it is possible to manufacture a metal porous separating plate composed of microholes having a corrugated sectional shape with a low flow friction resistance due to the manufacturing process characteristics.

BRIEF DESCRIPTION OF DRAWINGS

FIG. 1 is a perspective view showing an apparatus for manufacturing a channel plate according to one embodiment of the present invention.

FIG. 2 is a perspective view showing the slitting unit shown in FIG. 1.

FIG. 3 is a front view showing the pressing unit shown in FIG. 1.

FIG. 4 is a front view of the plate passing through the pressing unit shown in FIG. 3.

FIG. 5 is a front view of the plate after the spreading process.

FIGS. 6 to 8 are perspective views for explaining various embodiments of the pressing unit.

MODE FOR INVENTION

Hereinafter, an apparatus and a method for manufacturing a channel plate according to one embodiment of the present invention will be described in detail with reference to the attached drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 1 is a perspective view showing an apparatus for manufacturing a channel plate according to one embodiment of the present invention, FIG. 2 is a perspective view showing the slitting unit shown in FIG. 1, and FIG. 3 is a front view showing the pressing unit shown in FIG. 1.

In addition, FIG. 4 is a front view of the plate passing through the pressing unit shown in FIG. 3, and FIG. 5 is a front view of the plate after the spreading process.

Referring to FIG. 1, an apparatus (100) for manufacturing a channel plate related to one embodiment of the present invention is associated with a manufacturing apparatus for forming a channel for transferring a substance to a plate. In particular, a rotary manufacturing method is applied in the channel plate manufacturing apparatus (100). Also, in this document, the channel plate may be a separating plate for a fuel cell. At this time, the channel means a flow channel through which a reactant gas and/or water (generated water) flows.

The manufacturing apparatus (100) comprises a slitting unit (110) and a pressing unit (120).

The slitting unit (110) comprises a pair of first rollers (111, 114) disposed to allow passage of the plate (P). A plurality of raised patterns are provided on the outer circumferential surface of each of the first rollers (111, 114) in order to form a plurality of openings (O) in the transport process of the plate (P). In addition, the pressing unit (120) is provided to form a channel on the plate (P1) by pressurizing the opening (O) region of the plate (P1) passing through the slitting unit (110) to bend it in a predetermined angle and direction. Furthermore, the term 'opening region' may be used as a meaning including openings and an adjacent region of the openings.

Specifically, the manufacturing apparatus (100) comprises a slitting unit (110) comprising a pair of first rollers (111, 114) having a predetermined pattern for forming a plurality of openings (O) on the plate (P) in the transport process of the plate (P). The pair of first rollers (111, 114) is rotated to allow passage of the plate (P) to the space between them, and in the passing process of the plate (P), a plurality of openings (O) are formed on the plate (P) by the pattern.

In addition, the manufacturing apparatus (100) may further comprise a pressing unit (120) comprising a pair of third rollers (121, 122) provided so that each opening (O) region of the plate (P1) passing through the punching unit (110) is pressurized and bent in a predetermined angle and direction in order to form a channel.

Furthermore, the manufacturing apparatus (100) may further comprise a plurality of transport rolls (140) for transport of the plate (P).

Referring to FIGS. 1 and 3, the pair of third rollers (121, 122) is provided so as to have one or more stepped portions along the rotational axis direction (x-axis direction), respectively. In addition, the pair of third rollers (121, 122) may be provided such that the diameter of the upper third roller (121) and the diameter of the lower third roller (122), which are in contact with a specific point of the plate (P2), are different from each other. In the process of passing through the pressing unit (120), bending occurs in the opening (O) region, thereby forming a three-dimensional shape channel. Particularly, in the process of passing through the pressing unit (120), stretching/expanding is made on the plate (P2), and a three-dimensional microchannel shape can be realized through such processing. On the other hand, an unexplained reference numeral 123 denotes a space through which the plate passes.

Referring to FIG. 4, it can be confirmed that a corrugated sectional continuous member having a stepped portion in the height direction similar to that of the expanded metal lath molded product is formed.

In addition, the manufacturing apparatus (100) may further comprise a rolling unit (130) for rolling the plate passing through the pressing unit (120). Furthermore, the rolling unit (130) may comprise a pair of rolling rolls rotatably provided. As the plate passes through the rolling rolls, it is possible to secure a contact area with adjacent components (membrane-electrode assembly, gas diffusion layer, etc.). Besides, it is also possible to reduce a contact resistance and to control burrs that may occur during the processing/manufacturing step. On the other hand, after the pressurizing step is completed, a spreading step for spreading at least a part of the bent region of the plate in the process of transporting the plate (P2) may be optionally performed, if necessary. The front face of the plate after the spreading step is as shown in FIG. 5.

Referring to FIG. 2, the slitting unit (110) comprises a pair of first rollers (111, 114) disposed to allow passage of the plate, and each of the first rollers (111, 114) has a plurality of raised patterns (112, 113) on the outer circumferential surface.

In addition, the plurality of raised patterns (112, 113) may be provided with the same length, width, and thickness. Alternatively, the plurality of raised patterns (112, 113) may be provided such that at least one of length, width, and thickness is different from each other.

Furthermore, the pair of first rollers (111, 114) may have the same structure. To form the openings (O), the raised pattern of the upper first roller (111) and the raised pattern of the lower first roller (114), which are in contact with a specific point of the plate (P), may be provided to be the same. A thin sheet transport step is performed, which continuously transport the plate to the punching unit (110) mounted in a coil shape, and the punching unit (110) forms a cut line (openings) conforming a width and an arrangement shape of microchannels/ribs by matching of the upper and lower first rollers rotated by the motor in the clockwise/counterclockwise direction. On the other hand, a strip region between the cut lines may be a section where stretching/expanding is performed in accordance with the height of the microchannels.

Also, FIGS. 6 to 8 are perspective views for explaining various embodiments of the pressing unit.

The manufacturing apparatus (100) according to another embodiment of the present invention comprises a slitting unit (110) provided to have a predetermined pattern for forming a plurality of openings on a plate in a transport process of the plate, and a pressing unit (150, 160, 180) provided so that the opening region of the plate passing through the punching unit is pressurized and bent in a predetermined angle and direction in order to form a channel.

Referring to FIGS. 6 and 7, the pressing unit may comprise a pair of second rollers disposed to allow passage of the plate, and at least one second roller may have a plurality of raised patterns on the outer circumferential surface.

Referring to FIG. 6, the pressing unit (150) may comprise a pair of second rollers (151, 153) disposed to allow passage of the plate, and the upper and lower second rollers (151, 153) may have a plurality of raised patterns (152, 154) on the outer circumferential surface. At this time, the pair of second rollers (151, 154) may have the same raised pattern, and the raised pattern (152) of the upper second roller (151) and the raised pattern (154) of the lower second roller (153), which contact a specific point of the plate, may provided to be the same.

Referring to FIG. 7, the pressing unit (150) may comprise a pair of second rollers (151, 153) disposed to allow passage of the plate, and one second roller (161) (for example, the upper roller) may have a plurality of raised patterns (162) on the outer circumferential surface and the remaining second roller (164) (for example, the lower roller) may have no raised pattern on the outer circumferential surface. The outer circumferential surface of the lower second roller may be formed of a smooth surface (164) on which no pattern is formed.

Referring to FIG. 8, the pressing unit (180) may comprise a pair of second rollers (181, 183) disposed to allow passage of the plate, and the upper and lower second rollers (181, 183) may have a plurality of raised patterns (182, 184). At this time, the pair of second rollers (181, 183) may have different raised patterns from each other, and the raised pattern (182) of the upper second roller (181) and the raised pattern (182) of the lower second roller (183), which contact a specific point of the plate, may be provided to be different.

On the other hand, when the pressing unit is constructed as shown in FIGS. 6 to 8, the spreading step may be omitted.

In addition, a method for manufacturing a channel plate related to one embodiment of the present invention comprises a slitting step for forming a plurality of openings on the plate using a pair of first rollers provided to have a predetermined pattern in a transport process of the plate; and a pressurizing step for forming a channel on the plate by pressurizing the opening region of the completely punched plate with a pair of second rollers and bending it in a predetermined angle and direction.

Furthermore, as described above, the manufacturing method may further comprise a rolling step for rolling the plate in the transport process of the plate after the pressurizing step is completed.

Furthermore, the manufacturing method may further comprise a spreading step for at least partially expanding the bent region of the plate in the transport process of the plate after the pressurizing step is completed.

The preferred examples of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the present invention, it is possible to design a microhole shape of a three-dimensional metal porous separating plate for promoting the transfer of the reactant gas in the fuel cell reaction surface and controlling water balance.

The invention claimed is:

1. An apparatus for manufacturing a channel plate, which is a manufacturing apparatus for forming a channel for transferring a substance to a plate, comprising:
   a pair of first rollers disposed to allow passage of the plate, and provided with a raised pattern on an outer circumferential surface of each roller of the pair of first rollers to form a plurality of openings on the plate in a transport process of said plate; and
   a pair of second rollers disposed to allow passage of the plate and provided to form a channel on the plate by pressurizing a region of the plate having the plurality of openings passing through the pair of second rollers to bend the plate in a predetermined angle and direction, wherein at least one roller of the second pair of rollers has a raised pattern on an outer circumferential surface.

2. The apparatus for manufacturing a channel plate according to claim 1, wherein the raised patterns of the pair of first rollers are provided so as to have a same length, width, and thickness.

3. The apparatus for manufacturing a channel plate according to claim 1, wherein the raised patterns of the pair of first rollers are provided so that at least one of a length, width, and thickness of the raised patterns is different from each other.

4. The apparatus for manufacturing a channel plate according to claim 1, wherein the pair of first rollers has a same structure, and wherein the raised pattern of an upper roller of the pair of first rollers and the raised pattern of a lower roller of the pair of first rollers, which contact a specific point of the plate, are provided to be the same.

5. The apparatus for manufacturing a channel plate according to claim 1, wherein the pair of second rollers has a same raised pattern as the first pair of rollers, and
wherein the raised pattern of an upper roller of the pair of second rollers and the raised pattern of a lower roller of the pair of second rollers, which contact a specific point of the plate, are the same.

6. The apparatus for manufacturing a channel plate according to claim 1, wherein rollers of the pair of second rollers have different raised patterns from each other, and
wherein the raised pattern of an upper roller of the pair of second rollers and the raised pattern of a lower roller of the pair of second rollers, which contact a specific point of the plate, are different.

7. The apparatus for manufacturing a channel plate according to claim 1, wherein a first roller of the pair of second rollers has a plurality of raised patterns on the outer circumferential surface, and
wherein a second roller of the pair of second rollers has no raised pattern on the outer circumferential surface.

8. The apparatus for manufacturing a channel plate according to claim 1, wherein the channel plate is a separating plate for a fuel cell.

9. The apparatus for manufacturing a channel plate according to claim 1, further comprising a plurality of transport rolls for transporting the plate.

10. The apparatus for manufacturing a channel plate according to claim 1, further comprising a pair of third rollers pressurizing the region of the plate having the plurality of openings,
wherein the pair of third rollers has one or more stepped portions along the direction of the rotational axis.

11. The apparatus for manufacturing a channel plate according to claim 10, further comprising a rolling unit for rolling the plate passing through the second pair of rollers.

12. The apparatus for manufacturing a channel plate according to claim 11, wherein the rolling unit comprises a fourth pair of rollers.

13. The apparatus for manufacturing a channel plate according to claim 10, wherein the pair of third rollers is provided so that a diameter of an upper roller of the pair of third rollers and a diameter of a lower roller of the pair of third rollers, which contact a specific point of the plate, are different.

14. A method for manufacturing a channel plate for forming a channel for transferring a substance to a plate, comprising:
a punching step for forming a plurality of openings on the plate using a pair of first rollers provided to have a predetermined pattern in a transport process of the plate; and
a pressurizing step for forming a channel on the plate by pressurizing a region having the plurality of openings of the punched plate with a pair of second rollers and bending the plate in a predetermined angle and direction, wherein at least one roller of the second pair of rollers has a raised pattern on an outer circumferential surface.

15. The method for manufacturing a channel plate according to claim 14, further comprising a rolling step for rolling the plate in the transport process of the plate after the pressurizing step is completed.

16. The method for manufacturing a channel plate according to claim 15, further comprising a spreading step for at least partially expanding the bent region of said plate in the transport process of the plate after the pressurizing step is completed.

* * * * *